US012639916B2

(12) United States Patent
O'Donncha et al.

(10) Patent No.: US 12,639,916 B2
(45) Date of Patent: May 26, 2026

(54) FORECASTING LAND-BASED ENVIRONMENTAL VARIABLES USING SIMILARITY ANALYSIS AND TEMPORAL GRAPH CONVOLUTIONAL NEURAL NETWORKS

(71) Applicant: International Business Machines Corporation, Armonk, NY (US)

(72) Inventors: Fearghal O'Donncha, Aran Islands (IE); Malvern Madondo, Atlanta, GA (US); Muneeza Azmat, East Lansing, MI (US); Michael Jacobs, Beacon, NY (US); Raya Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 17/937,857

(22) Filed: Oct. 4, 2022

(65) Prior Publication Data

US 2024/0112442 A1 Apr. 4, 2024

(51) Int. Cl.
G06V 10/00 (2022.01)
G06V 10/46 (2022.01)
(Continued)

(52) U.S. Cl.
CPC ............ G06V 10/761 (2022.01); G06V 10/46 (2022.01); G06V 10/7635 (2022.01); G06V 10/82 (2022.01)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS

| | | | | |
|---|---|---|---|---|
| 8,520,949 | B1 * | 8/2013 | Bissacco | G06V 10/462 |
| | | | | 382/190 |
| 8,625,887 | B2 * | 1/2014 | Li | G06V 10/75 |
| | | | | 382/209 |

(Continued)

FOREIGN PATENT DOCUMENTS

| | | |
|---|---|---|
| CN | 114239686 A | 3/2022 |
| CN | 114818984 A | 7/2022 |
| CN | 114819260 A | 7/2022 |

OTHER PUBLICATIONS

Zhong et al., "Detect and attribute the extreme maize yield losses based on spatio-temporal deep learning", May 5, 2022.*

(Continued)

*Primary Examiner* — Amir Alavi
(74) *Attorney, Agent, or Firm* — Cantor Colburn LLP; Kelsey M. Skodje

(57) ABSTRACT

Embodiments are directed to a computer-implemented method of analyzing a land region that has been decomposed into a plurality of regular or irregular sub-regions. The computer-implemented method includes applying, using a processor system, a feature extraction process that extracts a set of sub-region environmental descriptors for each of the plurality of sub-regions. The processor system applies a similarity analysis to the set of sub-region environmental descriptors to generate groups of the plurality of sub-regions. The processor system creates a plurality of group-based graphs by encoding each of the groups into a corresponding group-based graph. A spatio-temporal neural network is used to train a model based at least in part on the plurality of group-based graphs.

20 Claims, 8 Drawing Sheets

(51) Int. Cl.

| | |
|---|---|
| *G06V 10/74* | (2022.01) |
| *G06V 10/762* | (2022.01) |
| *G06V 10/82* | (2022.01) |

(58) Field of Classification Search

CPC .... G06N 3/092; G06N 3/0454; G06N 3/0475; G06N 3/0464; G06N 20/00; G06N 20/10; G06N 20/20; G06V 10/82; G06V 10/761; G06V 10/762; G06V 10/764; G06V 10/765; G06V 10/85; G06V 10/25; G06V 10/40; G06V 10/7625; G06V 10/7635; G06V 10/46; G06V 20/13

See application file for complete search history.

(56) References Cited

U.S. PATENT DOCUMENTS

| | | | | |
|---|---|---|---|---|
| 8,995,758 | B1 * | 3/2015 | Bissacco | G06Q 30/06 |
| | | | | 382/181 |
| 9,582,735 | B2 * | 2/2017 | Dube | G06V 10/464 |
| 10,402,448 | B2 * | 9/2019 | Filgueiras De Araujo | |
| | | | | G06V 20/35 |
| 10,467,526 | B1 * | 11/2019 | Appalaraju | G06V 10/774 |
| 10,565,498 | B1 * | 2/2020 | Zhiyanov | G06N 3/0985 |
| 10,776,926 | B2 * | 9/2020 | Shrivastava | G06T 7/194 |
| 10,915,730 | B2 * | 2/2021 | Karpas | G06V 20/20 |
| 2021/0319254 | A1 * | 10/2021 | Yu | G06F 18/217 |
| 2021/0383502 | A1 * | 12/2021 | Brown | G06T 3/40 |
| 2024/0112442 | A1 * | 4/2024 | O'Donncha | G06V 10/761 |

OTHER PUBLICATIONS

Adab et al. "Machine learning to estimate surface soil moisture from remote sensing data." Water 12.11 (2020): 3223. 27 pages.

Arnold et al. "Soil and water assessment tool input/output file documentation version 2009." Texas Water Resources Institute, 2011. 662 pages.

ElSaadani et al. "Assessment of a spatiotemporal deep learning approach for soil moisture prediction and filling the gaps in between soil moisture observations." Frontiers in artificial intelligence 4 (2021): 636234. 14 pages.

Research Applications Laboratory. "WRF-Hydro® Modeling System." https://ral.ucar.edu/solutions/products/wrf-hydro-modeling-system (retrieved Sep. 19, 2022), 4 pages.

Schiariti. "Basic hydrology—runoff curve numbers." Mercer County Soil Conservation District (2012). 33 pages.

Shi et al. "Convolutional LSTM network: a machine learning approach for precipitation nowcasting." Advances in neural information processing systems 28 (2015). 9 pages.

Sun et al. "A graph neural network approach to basin-scale river network learning: the role of physics-based connectivity and data fusion." Hydrology and Earth System Sciences Discussions (2022): 1-35.

Sun et al. "Explore Spatio-Temporal Learning of Large Sample Hydrology Using Graph Neural Networks." Water Resources Research 57.12 (2021): e2021WR030394. Abstract. 5 pages.

Texas A&M University. "SWAT—Soil & Water Assessment Tool." https://swat.tamu.edu/ (retrieved Sep. 19, 2022), 2 pages.

Tsiporkova. "Dynamic time warping algorithm for gene expression time series." Power point presentation. Retrieved Sep. 11, 2010. 13 pages.

Vyas et al. "Dynamic structure learning through graph neural network for forecasting soil moisture in precision agriculture." arXiv: 2012.03506 (2020). 7 pages.

Vyas et al. "Semi-supervised Soil Moisture Prediction through Graph Neural Networks." arXiv preprint arXiv:2012.03506 (2020). 9 pages.

Xiang et al. "High-resolution rainfall-runoff modeling using graph neural network." arXiv preprint arXiv:2110.10833 (2021). 6 pages.

Ying et al. "GNNExplainer: Generating explanations for graph neural networks." Advances in neural information processing systems 32 (2019). 12 pages.

Zhao et al. "T-GCN: a temporal graph convolutional network for traffic prediction." IEEE Transactions on Intelligent Transportation Systems 21.9 (2020): 3848-3858.

* cited by examiner

Embedded Graph-
under-analysis
410A

Vector 412

Embedding
Technique 420

Graph-under-analysis
410

N

E

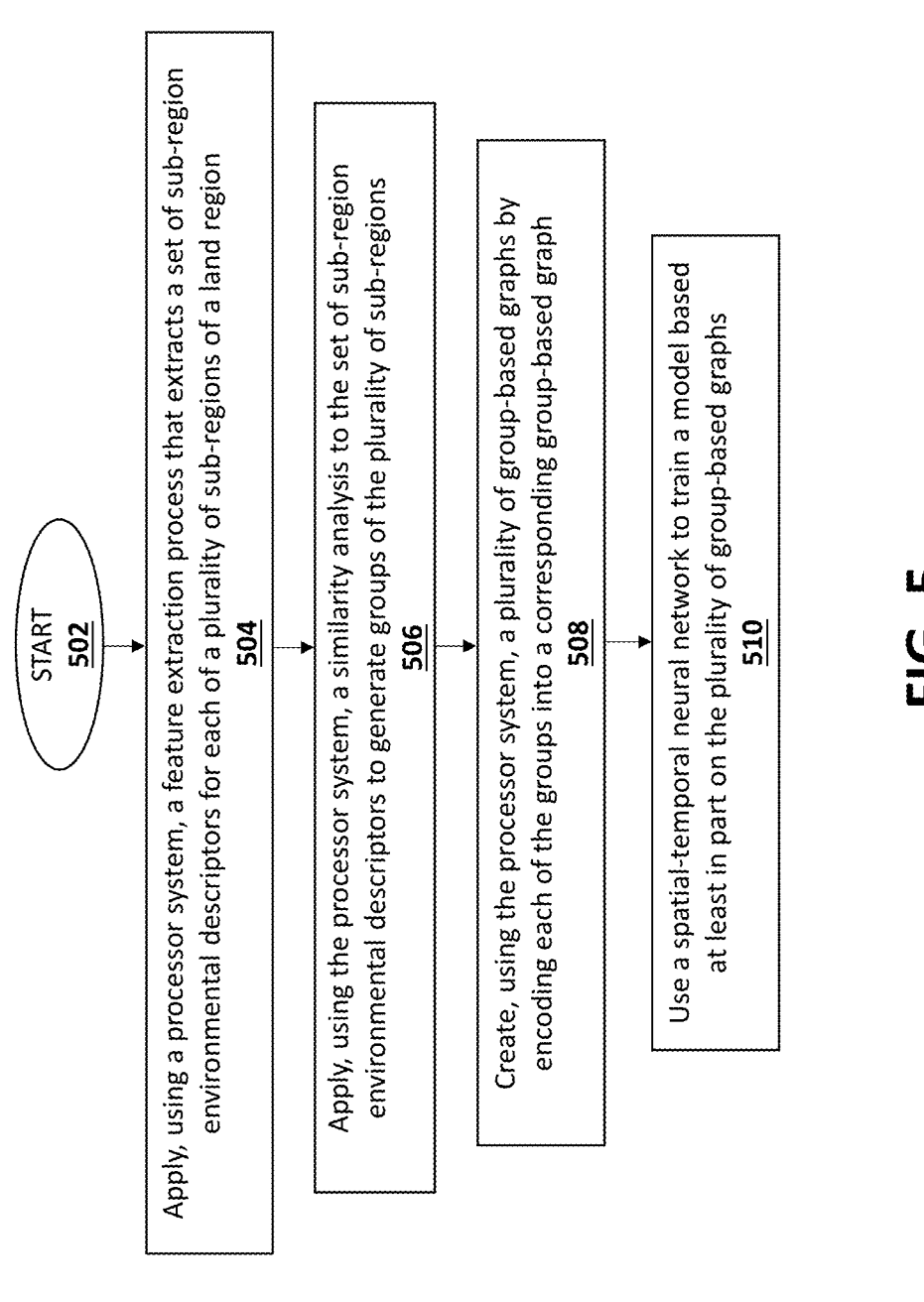

FIG. 5

START
502

Apply, using a processor system, a feature extraction process that extracts a set of sub-region environmental descriptors for each of a plurality of sub-regions of a land region
504

Apply, using the processor system, a similarity analysis to the set of sub-region environmental descriptors to generate groups of the plurality of sub-regions
506

Create, using the processor system, a plurality of group-based graphs by encoding each of the groups into a corresponding group-based graph
508

Use a spatial-temporal neural network to train a model based at least in part on the plurality of group-based graphs
510

500

FORECASTING LAND-BASED ENVIRONMENTAL VARIABLES USING SIMILARITY ANALYSIS AND TEMPORAL GRAPH CONVOLUTIONAL NEURAL NETWORKS

BACKGROUND

The present invention relates generally to programmable computers. More specifically, the present invention relates to programmable computer systems, computer-implemented methods, and computer program products operable to forecast land-based environmental variables (e.g., hydrological responses, evapotranspiration metrics, crop-yield, crop-growth, and the like) using a similarity analysis and temporal graph convolutional neural networks.

In agricultural practices, farmers grow plants of a given type in defined areas or fields. The ecological systems in which such plants are grown and harvested are generally considered among the most complex because, among other things, they are characterized by a large number of diverse components and nonlinear interactions that affect the yield of the relevant crop. For example, levels of irrigation, types of irrigation (e.g., channel, spray, drip, rain-only, etc.), soil acidity, soil drainage, the application of fertilizers, pest control schemes, altitude, daily temperatures, sun intensity, and the like can all affect how an individual plant grows in a given area or field. Because these conditions (i.e., the diverse components and the non-linear interactions) can vary over the surface area of a given field, the ability to forecast the field conditions allows farmers to predict the yield for a crop, make adjustments designed to improve yields, and select the appropriate arrangements for crop harvesting (e.g., determine silo space needed, plan for time of harvest, locate distributors, and/or plan for the next seeding).

Models, including machine learning models, have been developed to model ecological systems in order to assist farmers with forecasting the various land-based environmental variables (e.g., hydrological variables) that impact their land and their plants. In a typical scenario, a field-under-evaluation is decomposed or delineated into a set of sub-regions, which are generally referred to as catchments or polygons (i.e., regularly-shaped and/or irregularly-shaped regions). The model then attempts to determine the degree of connectivity between neighboring catchments in order to inform estimation and forecasting.

Known methods of performing machine-learning-based modeling of ecological systems have shortcomings. For example, the unstructured nature of catchments results in a series of interconnected irregular polygons that are difficult to analyze using classic deep learning approaches such as convolutional neural networks, which perform better on more structured, pixel-based datasets. Alternative deep neural networks on the other hand have demonstrated an ability to analyze time series datasets such as performing natural language processing tasks or forecasting of stock prices. However, such networks do not naturally incorporate spatial information into the prediction which is a critical driver in hydrological and land-surface processes.

Additionally, known methods of performing machine-learning-based modeling of ecological systems determine the degree of connectivity between neighboring catchments by analyzing geographical relationships between the neighboring catchments under the assumption that catchments that are geographically close to one another will have similar land-based environmental (e.g., hydrological) properties.

Examples of geographical physical relationships include the geographical distance from one catchment to a neighboring catchment, along with whether or not there is a physical flow mechanism from one catchment to a neighboring catchment. An example of such a physical flow mechanism is a geographical flow path that allows water to flow from one catchment as an output and into a neighboring catchment as an input. In practice, however, the assumption that neighboring catchments have closely related land-based environmental variables is not necessarily correct. Despite the proximity of neighboring catchments, each catchment can have features/attributes/descriptors that differ significantly from its neighboring catchment(s), and these features/attributes/descriptors can have a significant impact on a given catchment's land-based environmental properties/variables. Example catchment features/attributes/descriptors include elevation, surface area, soil-type, crops planted, and the like.

SUMMARY

Embodiments are directed to a computer-implemented method of analyzing a land region that has been decomposed into a plurality of sub-regions. The computer-implemented method includes applying, using a processor system, a feature extraction process that extracts a set of sub-region environmental descriptors for each of the plurality of sub-regions. The processor system applies a similarity analysis to the set of sub-region environmental descriptors to generate groups of the plurality of sub-regions. The processor system creates a plurality of group-based graphs by encoding each of the groups into a corresponding group-based graph. A spatio-temporal neural network is used to train a model based at least in part on the plurality of group-based graphs.

The above-described computer-implemented method provides improvements over known methods of analyzing a decomposed land region in that the computer-implemented method uses a similarity analysis to uncover groups of sub-regions that have similar environmental descriptors. The use of similarity analysis provides a more representative framework that is informed by the hydrological modeling technique known as group response units (GRUs). GRUs include groups of hydrological response units (HRUs) that have similar hydrological characteristics and consequently have more comparable hydrological response than neighboring HRUs which might have different characteristics (e.g., crop farming versus livestock farming). Additionally, the computer-implemented method improves the ability of the spatio-temporal neural network to handle unstructured sub-region environmental descriptors by utilizing graphs to represent the grouped sub-region environmental descriptors. Providing environmental descriptors encoded into group-based graphs to the spatio-temporal neural network provides a novel "domain-inspired" spatio-temporal neural network that goes beyond purely data-driven models. The environmental descriptors encoded into group-based graphs incorporates domain knowledge in the form of problem-specific information (e.g., the features/attributes/descriptors that are known to have an impact on hydrological properties of land) that can be used to improve the model and/or simplify the training process. Incorporating domain knowledge in accordance with aspects of the invention is particularly useful for the very difficult learning task of modeling ecological systems (e.g., the decomposed land region) that are characterized by a large number of diverse components and nonlinear interactions that affect the yield of the relevant crop(s).

In addition to one or more of the features described above, or as an alternative to any of the foregoing embodiments, the set of sub-region environmental descriptors include static descriptors that do not substantially change over time, along with dynamic descriptors that change over time.

The above-described computer-implemented method provides improvements over known methods of analyzing a decomposed land region in that the effectiveness of the domain-informed features is enhanced by providing both static descriptors and time-varying descriptors that can be processed by time-varying analysis components of the spatio-temporal neural network.

In addition to one or more of the features described above, or as an alternative to any of the foregoing embodiments, the groups comprise clusters, the similarity analysis includes a cluster analysis, the cluster analysis is operable to generate inter-cluster distance data, and the processor system is operable to create the plurality of group-based graphs by encoding the inter-cluster distance data.

The above-described computer-implemented method provides improvements over known methods of analyzing a decomposed land region in that the effectiveness of the domain-informed features is enhanced by taking into account inter-cluster distance data that further improves the neural network's ability to recognize relationships between sub-regions.

In addition to one or more of the features described above, or as an alternative to any of the foregoing embodiments, the cluster analysis is operable to generate intra-cluster distance data, and the processor system is further operable to create the plurality of group-based graphs by encoding the intra-cluster distance data.

The above-described computer-implemented method provides improvements over known methods of analyzing a decomposed land region in that the effectiveness of the domain-informed features is enhanced by taking into account intra-cluster distance data that further improves the neural network's ability to recognize relationships between sub-regions.

Embodiments of the invention further provide computer systems and computer program products having substantially the same features and technical benefits as the above-described computer-implemented methods.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

FIG. 5 depicts an exemplary flow diagram illustrating a methodology in accordance with embodiments of the invention;

Figure 1:
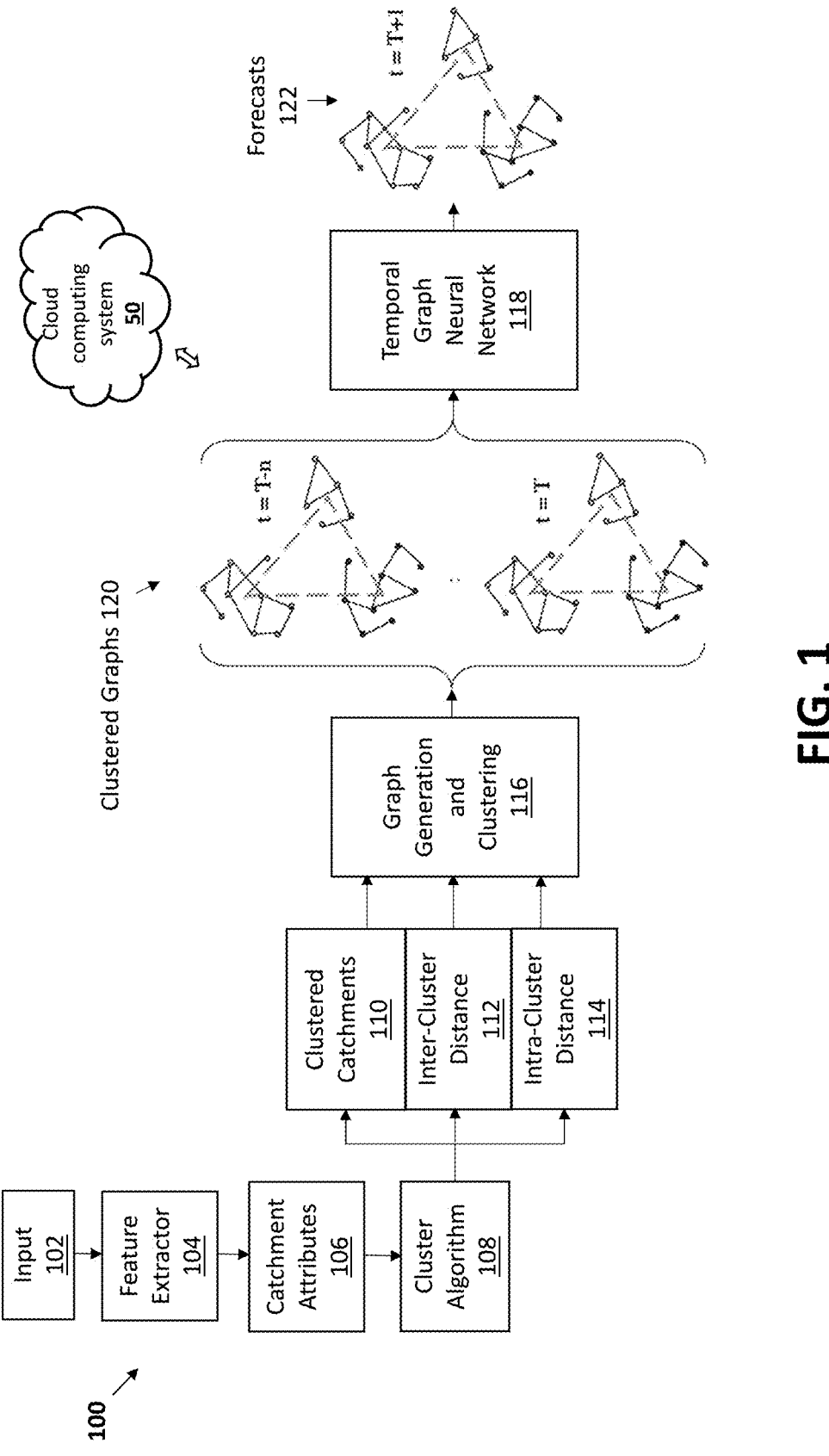
FIG. 1 depicts an exemplary system in accordance with embodiments of the present invention.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification are illustrated as logical blocks such as generators, discriminators, modules, processors, processor systems, and the like. Embodiments of the invention apply to a wide variety of implementations of the logical blocks described herein. For example, a given logical block can be implemented as a hardware circuit operable to include custom VLSI circuits or gate arrays, as well as off-the-shelf semiconductors such as logic chips, transistors, or other discrete components. The logical blocks can also be implemented in programmable hardware devices such as field programmable gate arrays, programmable array logic, programmable logic devices, and the like. The logical blocks can also be implemented in software for execution by various types of processors. Some logical blocks described herein can be implemented as one or more physical or logical blocks of computer instructions which can, for instance, be organized as an object, procedure, or function. The executables of a logical block described herein need not be physically located together but can include disparate instructions stored in different locations which, when joined logically together, include the logical block and achieve the stated purpose for the logical block.

Turning now to an overview of aspects of the invention, embodiments of the invention provide programmable computer systems, computer-implemented methods, and computer program products operable to forecast land-based cluster algorithm (e.g., hydrological responses, evapotranspiration metrics, crop-yield, crop-growth, etc.) using a similarity analysis and temporal graph convolutional neural networks. Although embodiments of the invention described herein focus on hydrological variables, it is understood that embodiments of the invention are not limited to hydrological variables and could be applied using any suitable land-based environmental variable(s).

In embodiments of the invention, a land region under analysis is decomposed or delineated into a set of sub-regions or catchments using known techniques, and a set of data for hydrological variables such as runoff, soil moisture, or evapotranspiration is gathered for a subset of the catchments. In a non-limiting example, if a land region has been decomposed into 3000 catchments, the subset can be 500 of the 3000 catchments. In machine learning terminology, the above-described variables are identified as labels or predictand. In parallel, a set of features or predictors are collected, which are known or hypothesized drivers for the label data. Example features/predictors include precipitation, humidity, air temperature, winds, and the like. In some embodiments of the invention, the sets of data can be gathered from observations made at the subset catchments, and the sets of data are gathered for each catchment in the subset.

In embodiments of the invention, a novel methodology is used to train a model to estimate the identified hydrological variables at the subset of 500 catchments, and the trained model can be used to estimate the identified hydrological variables at the entire set of 3000 catchments. In some embodiments of the invention, the sets of data can be from a combination of observations and gridded model product data. In contrast to known approaches that analyze connections between catchments using proximity-based considerations, as well as connective geographical data of catchments in the geographical space, the above-described sets of data represents features or attributes or descriptors of each catchment. The novel model training methodology uses a feature extraction module to gather features/attributes/descriptors from the sets of data and determines connections between catchments based on the similarity of their features/attributes/descriptors. In some embodiments of the invention, the similarity of features/attributes/descriptors is determined using clustering techniques. Clustering or cluster analysis is a type of unsupervised learning technique used to find commonalities between data elements that are otherwise unlabeled and uncategorized. The goal of clustering is to find distinct groups or "clusters" within a data set. Using a machine language algorithm, clustering tools create groups where items in a similar group will, in general, have similar characteristics to each other. Examples of known clustering techniques include K-means and hierarchical clustering.

In accordance with aspects of the invention, the features/attributes/descriptors include features/attributes/descriptors that are known to have an impact on hydrological properties of land. In some embodiments of the invention, the features/attributes/descriptors can be static or dynamic. In general, static features/attributes/descriptors do not substantially change over time (e.g., elevation, soil type, slope, vegetation properties, etc.), and dynamic features/attributes/descriptors change over time (e.g., temperature/precipitation/humidity over the past year). Accordingly, the set of data gathered/extracted in accordance with embodiments of the invention includes both spatial components and time-varying components.

The spatial data, also known as geospatial data, used in connection with aspects of the invention includes any data related to or containing information about a specific location on the Earth's surface. Such spatial data can exist in a variety of formats and contains more than just location specific information. Spatial data can be represented as vector data and/or raster data. Vector data can be described as graphical representations of the real world. The three main types of vector data include points, lines, and polygons. Connecting points create lines, and connecting lines that create an enclosed area create polygons. Vectors are best used to present generalizations of objects or features on the Earth's surface. Raster data is data that is presented in a grid of pixels. Each pixel within a raster has a value, whether it be a color or unit of measurement, to communicate information about the element in question. A "raster" typically refers to imagery. However, in the spatial world, raster data specifically refers to ortho-imagery, which are photos taken from satellites or other aerial devices. Raster data quality varies depending on resolution and the task at hand. Finally, spatial data used in connection with embodiments of the invention contains more information than just a location on the surface of the Earth. Any additional information, or non-spatial data, that describes a feature is referred to as an attribute. The spatial data used in embodiments of the invention can have any amount of additional attributes accompanying information about the location. For example, the features/attributes/descriptors used in accordance with embodiments of the invention includes features/attributes/descriptors that are known to have an impact on hydrological properties of land. In some embodiments of the invention, the features/attributes/descriptors can be static or dynamic. In general, static features/attributes/descriptors do not substantially change over time (e.g., elevation, soil type, slope, vegetation properties, etc.), and dynamic features/attributes/descriptors change over time (e.g., temperature/precipitation/humidity over the past year).

In embodiments of the invention, the set of gathered/extracted data is grouped or clustered based on a level of similarity between the features/attributes/descriptors of gathered/extracted data. The intra-cluster distance (and optionally the inter-cluster distance) is computed. Graph topology is introduced within each cluster that considers two primary factors—namely, whether two catchments in a cluster are connected (e.g., based on whether similarity distance exceeds some threshold); and the degree of connectivity for each cluster/graph.

A spatio-temporal model is trained on the set of data to perform the task of forecasting one or more selected land-based environmental variables, which can be one or more selected hydrological variables. In some embodiments of the invention, the spatio-temporal model is implemented as a temporal graph neural network (TGNN) model. In some embodiments of the invention, the TGNN model can be implemented by combining a GNN with a long short-term memory (LSTM). The GNN explicitly encodes the spatial relationships of feature/attribute/descriptor similarities, and the LSTM model can learn time-dependent relationships when trained on a series of the features/attributes/descriptors (e.g., precipitation, humidity, temperature, solar radiations) and labels (e.g., soil moisture, evapotranspiration, etc.). Time varying features/attributes/descriptors can include weather (precipitation, snowfall, temperature, solar radiation, etc.), hydrology (e.g., snowmelt), and external forcings (e.g., managed dams, other extraction sources, etc.) at each catchment. Time-varying labels can include runoff, soil moisture, evapotranspiration, and the like. Within each cluster, each catchment is informed with the graph information (connected nodes and degree of connectivity) together with an LSTM model at each catchment. Optionally a second layer of graph topology can be used to describe the connectivity between clusters (or inter-cluster) using a similar approach. The trained model applies substantially same analysis sequence used during training to new data from new catchments (e.g., catchments outside the subset) to perform the task of forecasting one or more selected land-based environmental variables, which can be one or more selected hydrological variables.

Accordingly, embodiments of the invention provide technical effects and technical benefits. For example, embodiments of the invention provide a novel "domain-inspired" temporal graph convolution neural network that goes beyond purely data-driven models by incorporating domain knowledge in the form of problem-specific information (e.g., the use of features/attributes/descriptors that are known to have an impact on hydrological properties of land) that can be used to improve the model and/or simplify the training process. The novel methods of incorporating domain knowledge in accordance with aspects of the invention are particularly useful for the very difficult learning task of modeling ecological systems that are characterized by a large number of diverse components and nonlinear interactions that affect the yield of the relevant crop(s). In some embodiments of the invention, a cluster algorithm based on dynamic time warping (DTW) clusters together catchment attributes with similar features regardless of their spatial proximity. For each cluster, the graph topology is extracted from a set of similarity metrics that encompass static and dynamic environmental (e.g., hydrological) catchment attributes. Embodiments of the invention further include a novel GNN framework and time-series forecasting model (e.g., an LSTM model) operable to provide increased forecasting accuracy from using a wide range of environmental (e.g., hydrological) features/attributes/descriptors to inform predictions and forecasting.

Additionally, in contract to approaches that use a GNN approach to represent spatial patterns by superimposing a graph topology over the physical streamflow network, aspects of the invention instead generate the topology based on the degree of hydrological similarity between individual catchments. This provides a more representative framework that is informed by using a hydrological modeling technique known as group response units (GRUs). GRUs include groups of hydrological response units (HRUs) that have similar hydrological characteristics and consequently have more comparable hydrological response than neighboring HRUs which might have different characteristics (e.g., crop farming versus livestock farming).

Additionally, embodiments of the invention improve forecasting accuracy over known land-based environmental variable forecasting. The use of spatio-temporal machine learning approaches indirectly increases the volume of training data that is available for each catchment because information from other catchments are also incorporated into the model prediction. More specifically, instead of limiting the catchment analysis to a comparison of catchments that are physically close to one another, or that have a limited number of geographical properties in common, embodiments of the invention utilize similarity clustering techniques and graph representations to enable gathering a wide variety of catchment features/attributes/descriptors and using the attributes/features/descriptors and a similarity clustering to uncover a large number of catchments that have similar features/attributes/descriptors regardless of whether the catchments are in close proximity or have overlapping geographical properties. For example, a catchment in Arizona and a catchment in Ireland can be used to train a forecasting model if their features/attributes/descriptors are sufficiently similar. Additionally, the difficulty that known machine learning forecasting systems have with handling unstructured data is addressed in embodiments of the invention by utilizing graphs to represent unstructured data. Polygons and other irregular objects can be represented more easily in graphs than in traditional machine learning approaches such as convolutional neural networks.

Turning now to a more detailed description of aspects of the present invention, FIG. 1 depict a non-limiting, simplified block diagram of system 100 operable to forecast land-based environmental variables (e.g., hydrological responses, evapotranspiration metrics, crop-yield, crop-growth, etc.) using a similarity analysis and temporal graph convolutional neural networks in accordance with embodiments of the invention. More specifically, the system 100 includes an input module 102, a feature extraction module 104, a catchment attributes module 106, a cluster algorithm module 108, a clustered catchments module 110, an inter-cluster distance module 112, an intra-cluster distance module 114, a graph generation and clustering module 116, and a temporal graph neural network (TGNN) module 118, configured and arranged as shown. In embodiments of the invention, the system 100 is depicted in the context of operations used to train a TGNN model (not shown separately) of the TGNN module 118. Post-training, the functionality of the system 100 that is upstream from the TGNN 118 is, in effect built into the trained TGNN model and used to generate reliable forecasts 122 on non-training (or real world) data provided at the input module 102.

Figure 8:
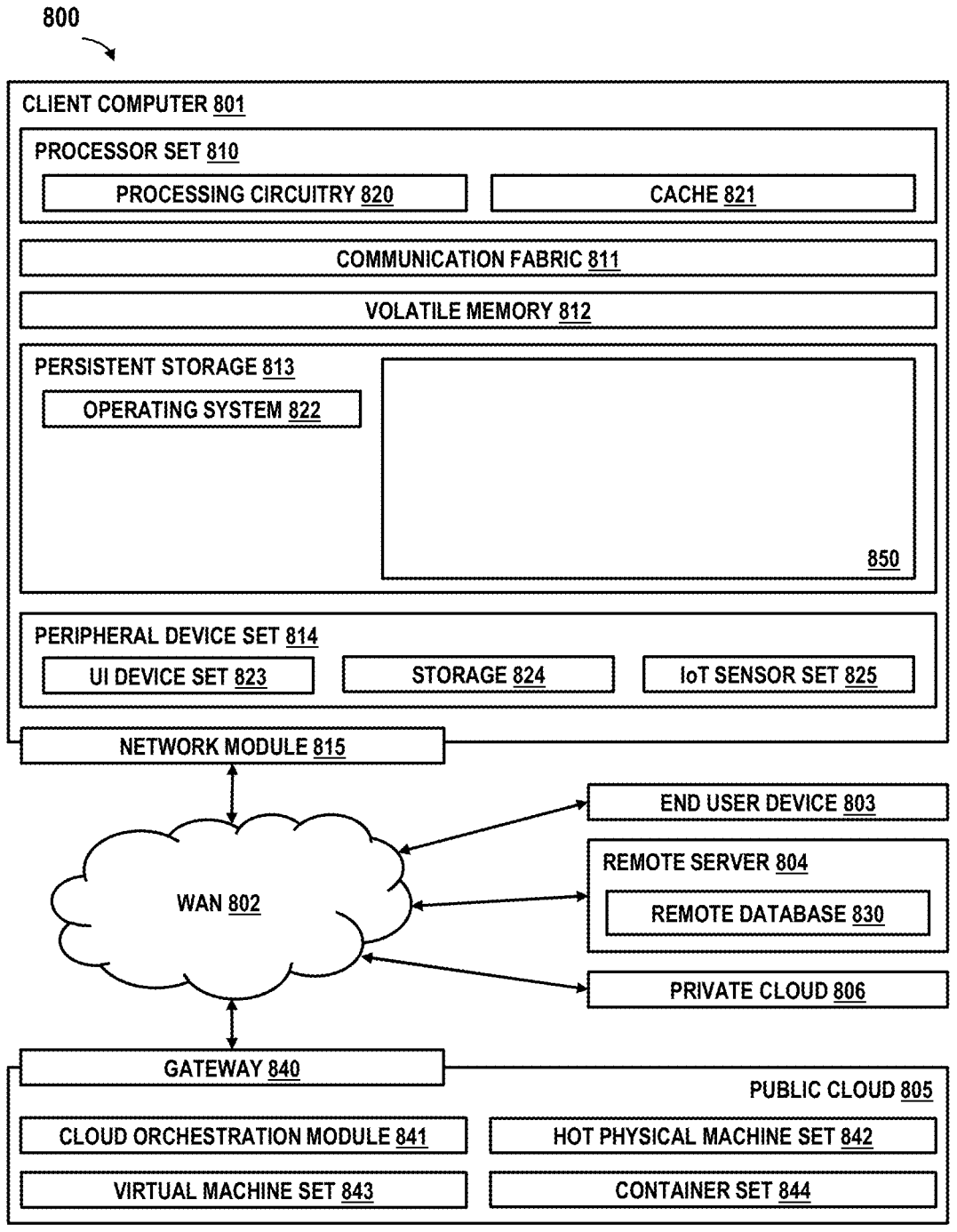
FIG. 8 depicts a computing environment capable of implementing aspects of the invention.

In embodiments of the invention, a cloud computing system 50 is in wired or wireless communication with one or more components/modules of the system 100. Cloud computing system 50 can supplement, support, or replace some or all of the functionality of the components/modules of the system 100. Additionally, some or all of the functionality of the components/modules that form the system 100 can be implemented as a node of the cloud computing system 50. Additional details of suitable cloud computing functionality are provided by the computing environment 800, which is depicted in FIG. 8 and described in greater detail subsequently herein.

The components/modules of the system 100 shown in FIG. 1 are depicted separately for ease of illustration and explanation. In embodiments of the invention, the functions performed by the components/modules of the system 100 can be distributed differently than shown. For example, in some embodiments of the invention, the graph generation and clustering module 116 can be integrated into a single module with the TGNN module 118 and vice versa.

As shown in FIG. 1, the input module 102 is operable to receive training inputs to the system 100. The training inputs can be from any suitable source. In embodiments of the invention, the training inputs are the features/attributes/descriptors of the previously-described subset of catchments used to train the TGNN model (not shown separately) of the TGNN module 118. The feature extraction module 104 is operable to evaluate the training data and extract therefrom the specific variables that are used to categorize individual catchments. In embodiments of the invention, the specific variables are depicted as the catchment attributes module 106 and can include catchment descriptors, time-varying features that describe hydrological responses, and/or time-varying labels. In embodiments of the invention, the catchment descriptors can include area, slope, vegetation type, soil type, hydrological properties, climate attributes, and the like. The time-varying features that describe hydrological responses can include precipitation, humidity, temperature, snowfall, snow melt, and the like. The time-varying labels can include measured or estimated observations at the subset of catchments such as runoff, soil moisture, evapotranspiration), and the like.

The catchment attributes at the catchment attributes module 106 are provided to the cluster algorithm module 108, which is operable to cluster the subset catchments based on similarities identified in the catchment attributes. The cluster algorithm module 108 can automatically recognize the patterns inside the catchment attributes even without data labels. In some embodiments of the invention, the clustering operations of the cluster algorithm module 108 are operable to cluster data using graphs that consider point data (as shown in FIG. 2) or time-series data (as shown in FIG. 3).

Figure 2:
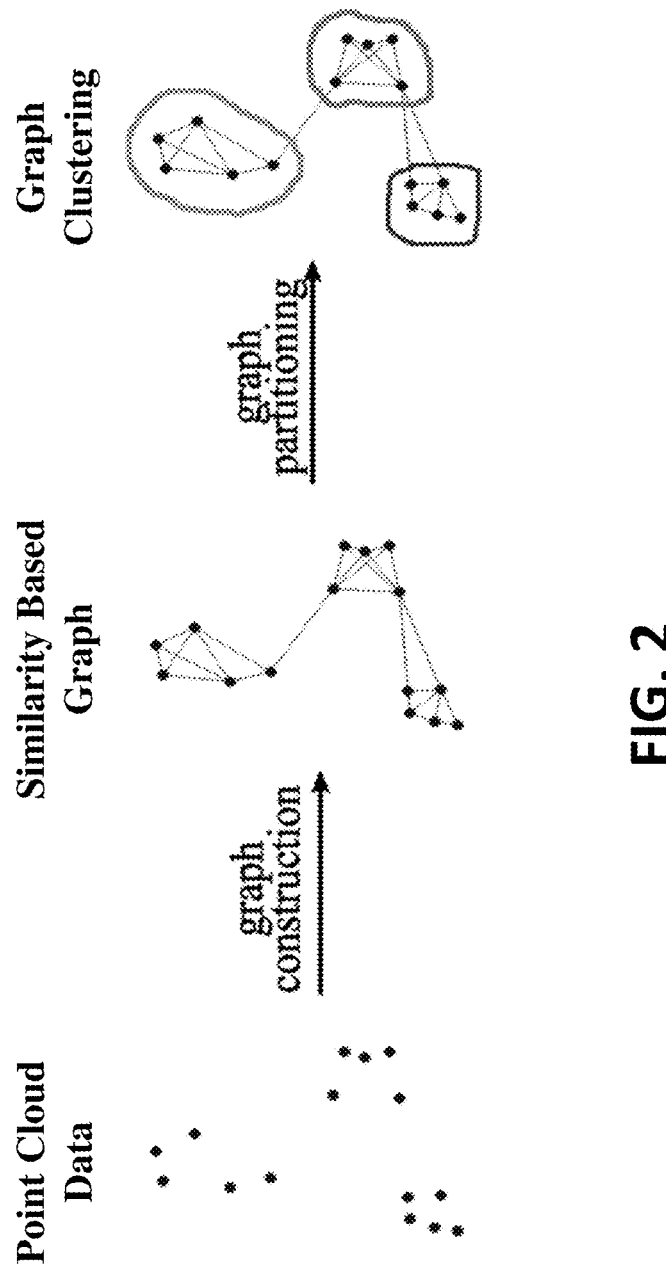
FIG. 2 depicts an exemplary cluster analysis in accordance with embodiments of the invention.

FIG. 2 depicts an example of how the cluster algorithm module 108 can utilize static point cloud data to perform its clustering operations. In general, the terms "point cloud data" is the term used to refer to the data points collected for a given geographical area, terrain, building or space. As shown by the methodology 200 shown in FIG. 2, the catchment attributes of the catchment attributes module 106 can be generated as point cloud data, which is the leftmost set of Data points in FIG. 2. Graph construction is applied to the Data points to generate a Similarity Graph using an appropriate distance metric, and graph partitioning is applied to generate independent cluster Graphs. Clusters are generated from the Similarity Graph by removing graph edges based on an optimal partitioning strategy (i.e., minimum number of cuts).

Figure 3:
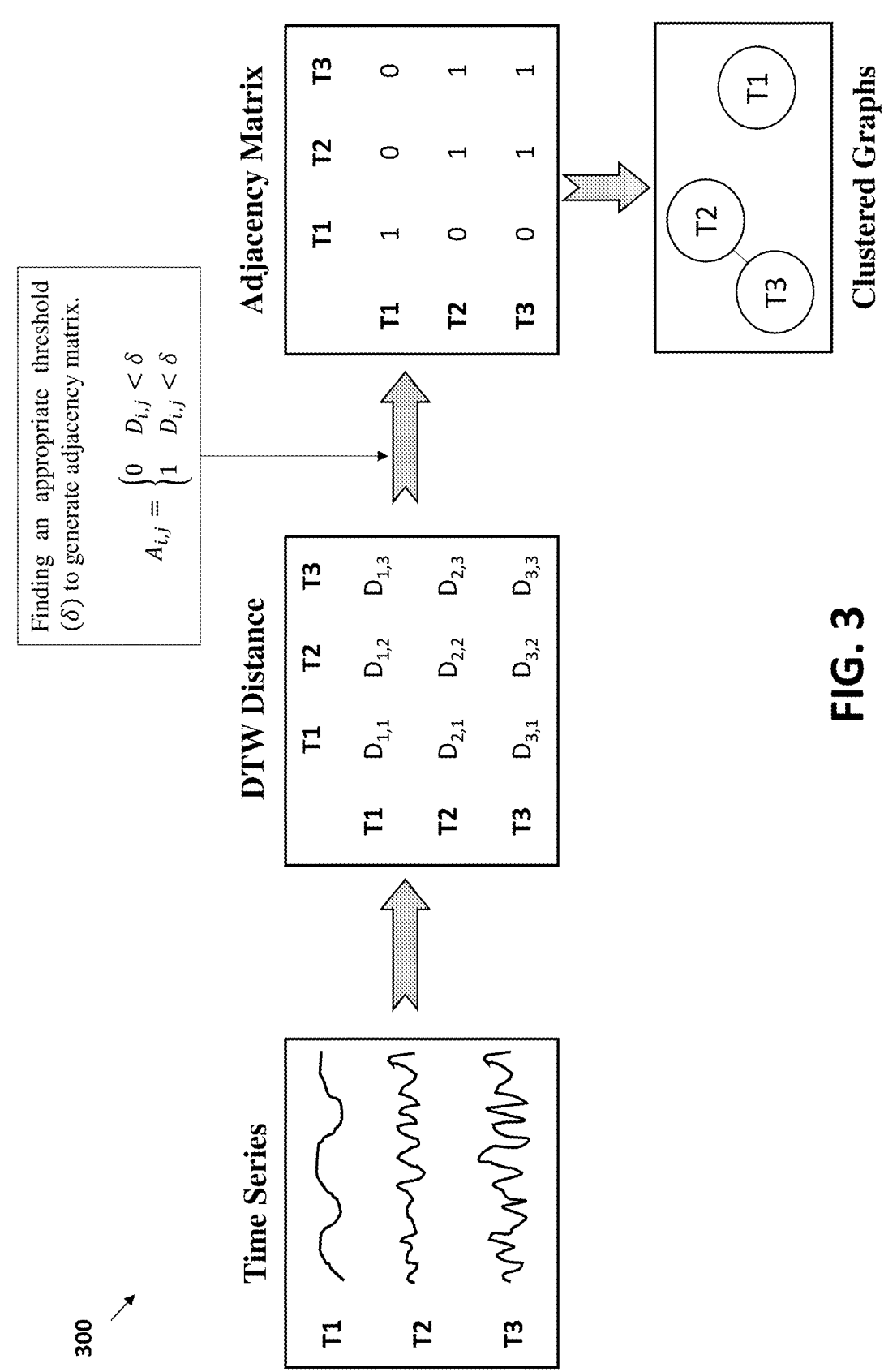
FIG. 3 depicts an exemplary time-series analysis in accordance with embodiments of the invention.

FIG. 3 depicts an example of how the cluster algorithm module 108 can utilize point time-series data to perform its similarity-based clustering operations on time-series data. More specifically, FIG. 3 depicts how embodiments of the invention can take on time varying features using dynamic time warping (DTW), which is an algorithm for comparing two time series and identifying the similarity between them. Instead of comparing static average temperature or average precipitation levels to identify similarity, embodiments of the invention compare, for example, the daily values of temperature and/or precipitation over a multi-year period and computes a similarity between those. This allows a static graph (e.g., the clustered graphs 120) to represent time-varying features. The DTW process 300 depicted in FIG. 3 proceeds by accessing Time series data (e.g., from the catchment attributes module 106) and generating therefrom a Distance matrix between all available time series using an appropriate metric (cross-correlation, DTW etc.). Use domain-informed threshold value to convert continuous distance values into binary values effectively transforming the Distance matrix to a graph-based Adjacency matrix. The Adjacency matrix represents connectivity of all nodes and is used to generate graphs. Alternatively DTW distances of the time series can be used with a cluster algorithm (e.g., K-means etc.) to generate disjoint clusters. Graph topology is introduced on the disjoint clusters based on degree of connectivity using the DTW distance.

Returning to FIG. 1, the cluster algorithm module 108, using, for example, the methodologies 200, 300, is operable to cluster the subset catchments based on similarities identified in the catchment attributes to thereby generate the clustered catchments at the clustered catchments module 110; the inter-cluster distances at the inter-cluster distance module 112; and the intra-cluster distances at the intra-cluster distance module 114. The inter-cluster distances at the inter-cluster distance module 112 provide similarity information to the training process by informing the system 100 that clusters that are closest to one another (in relation to a threshold, for example) are more similar than clusters that are further from one another. In response, the training process will flow more information through the closest clusters as part of the training process. Similarly, the intra-cluster distances at the intra-cluster distance module 114 provide similarity information to the training process by informing the system 100 of the catchments within each cluster that are closest to one another (in relation to a threshold, for example) and that are more similar than catchments that are further from one another. In response, the training process will flow more information through the closest catchments as part of the training process. In accordance with embodiments of the invention, the inter-cluster distances at the inter-cluster distance module 112 provide a greater level of connectivity for the training process, but can be omitted if it is determined that a greater level of connectivity is not required and/or does not meaningfully improve the reliability of the post-training forecasts generated by the system 100. In some embodiments of the invention, the determination that the intra-cluster distances at the intra-cluster distance module 114 can be omitted can be based on the level of model accuracy achieved by the. In some embodiments of the invention, the determination that the intra-cluster distances at the intra-cluster distance module 114 can be omitted can be based on the computational expense of the intra-cluster graph computation.

The graph generation and clustering module 116 is operable to receive the clustered catchments, the inter-cluster distances, and/or the intra-cluster distance from modules 110, 112, 114 and encode them into graph topologies, which are illustrated by the clustered graphs 120. The graph topologies can be used to identify clusters that are connected (e.g., below a distance threshold) and identify the degree of that connectivity. If a connection distance between clusters is not below a threshold, the clusters are flagged as not connected, and no training information flows between them. If a connection distance between clusters is below a threshold, the clusters are flagged as connected, and training information flows between them.

Figure 4:
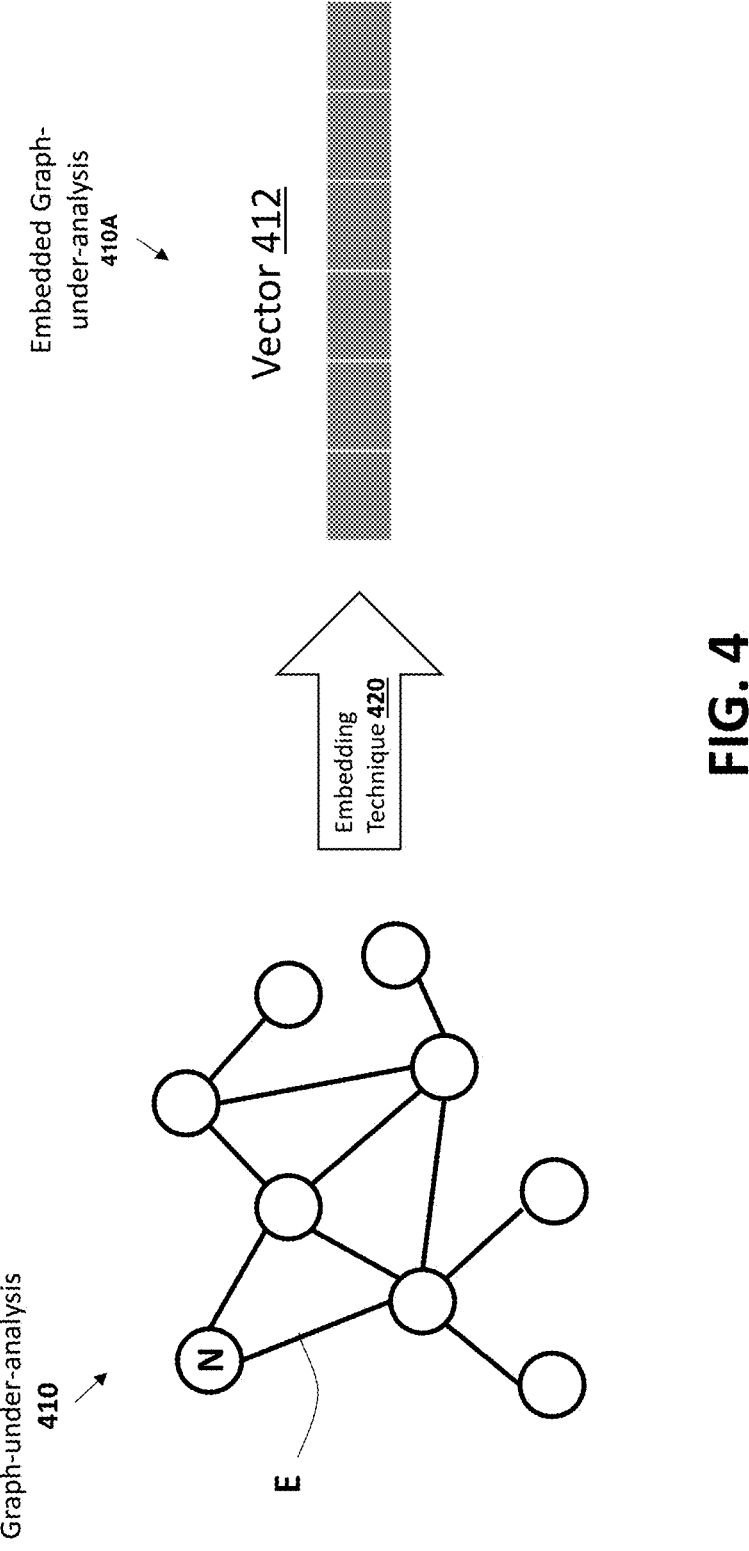
FIG. 4 depicts an exemplary vectorized graph in accordance with embodiments of the invention.

FIG. 4 depicts additional details about a graph-under-analysis (GUA) 410, which is a component of the clustered graphs 120 (shown in FIG. 1). In general, graphs are mathematical structures used to model pairwise relations between objects, which are generally represented by an "adjacency matrix," an example of which is shown in FIG. 3. A graph (e.g., GUA 410) in this context is made up of nodes (N) (also called vertices or points) that are connected by edges (E) (also called links or lines). The adjacency matrix includes a square matrix whose elements indicate whether pairs of vertices are connected or not in the graph. A distinction is made between undirected graphs in which edges link two vertices symmetrically and directed graphs in which edges link two vertices asymmetrically. Graphs can be used to model many types of relations and processes in physical, biological, social, and information systems. The term network can be defined as a graph in which attributes (e.g., features, attributes, descriptors of catchments) are associated with the vertices and edges. In embodiments of the invention, sub-regions or catchments of a given land region are analyzed by representing the catchments as nodes of a graph then analyzing the graph.

In embodiments of the invention where the GUA 410 is an encoding of the clustered catchments of the clustered catchments module 110 and the inter-cluster distances of the inter-cluster distance module 112, the nodes N represent one of the clusters, and the edges E represent the distance between clusters. In embodiments of the invention where the GUA 410 is an encoding of the intra-cluster distances of the intra-cluster module 114, the nodes N represent a catchment within a given cluster, and the edges E represent the distances between the catchments within the given cluster. Although graphs are a meaningful and understandable representation of datasets organized as a network/system, the edge/node relationships in graphs can only be analyzed using a specific subset of mathematics, statistics, and machine learning techniques. In order to allow GUA 410 to be used in a broad range of machine learning tools, the GUA 410 is translated to a vector space (e.g., vector 412) known as embeddings or graph embeddings (e.g., embedded GUA 410A). Graph embeddings are the transformation of various graph properties to a vector or a set of vectors. In general, computer-based analysis operations performed on vectors is simpler and faster than comparable analysis operations performed directly on graphs. The vector space captured or encoded in a graph embedding should include the graph topology, vertex-to-vertex relationship, and other relevant information about the graph, its subgraphs, and its vertices.

Returning to FIG. 1, the notations "t=T−n" and "t=T" represent evolution of the clustered graphs 120 as additional time series information is encoded by the graph generation and clustering module 116. The clustered graphs 120 (particularly the clustered graphs 120 at t=T) are fed to the temporal graph neural network (TGNN) 118, which generates forecasts 122, which represent a prediction of where the clustered graphs 120 will be at "t=T+1". More specifically, the clustered graphs 120 represent a static structure describing the relationship (through graph edges) between different catchments/stations (represented as graph nodes) (i.e., spatial block). Nodes that are not connected can be identified based on the distance between generated clusters (i.e., if the distance is greater than some threshold value). The degree of connectivity or similarity can be expressed by the intra-cluster distance (i.e., nodes that are closer have higher connectivity) and passed to the graph topology. Time-varying features, include weather data and associated hydrological response (labels) (i.e., temporal block). Typically, these data consist of causality which requires approaches that can incorporate this historic dependence. In embodiments of the invention, the TGNN 118 is operable to utilize one or more of a variety of time series forecasting models to represent these temporal dependencies including recurrent neural networks (RNN), gated recurrent unit models (GRU), and long short-term memory (LSTM). At each node (or station), the TGNN 118 employs a time series model, taking as inputs the time-varying features (weather, external fluxes, river management structures such as dams, etc.) and associated labels (runoff, soil moisture, evapotranspiration, etc.). Graph data represents the spatial dependencies which inform time series prediction at every node or station. A prediction is generated at each station with the corresponding time series forecasting model (e.g., LSTM) to generate the forecast(s) 122. In embodiments of the invention, the forecasts 122 (i.e., a prediction of where the clustered graphs 120 will be at "t=T+1") can be decoded from graph data to the forecasts of one or more selected land-based environmental variables, which can be one or more selected hydrological variables.

FIG. 5 depicts a computer-implemented methodology 500 that can be implemented by the system 100 in accordance with aspects of the invention. The methodology 500 begins at block 602 then moves to block 604 where a processor system (e.g., the system 100 shown in FIG. 1 using the computing environment 800 shown in FIG. 8) applies a feature extraction process that extracts a set of sub-region environmental descriptors for each of a plurality of sub-regions of a land region. At block 606, the processing system applies a similarity analysis to the set of sub-region environmental descriptors to generate groups of the plurality of sub-regions. At block 608, the processor system creates a plurality of group-based graphs by encoding each of the groups into a corresponding group-based graph. At block 610, a spatio-temporal neural network is used to train a model based at least in part on the plurality of group-based graphs.

Accordingly, it can be seen from the foregoing detailed description that embodiments of invention provide technical benefits and create technical effects. Embodiments of the invention improve forecasting accuracy over known land-based environmental variable forecasting systems because aspects of the invention significantly increase the amount of training data that is available for each catchment. More specifically, instead of limiting the catchment analysis to a comparison of catchments that are physically close to one another, or that have a limited number of geographical properties in common, embodiments of the invention utilize similarity or clustering techniques and graph representations to enable gathering a wide variety of catchment features/attributes/descriptors and using the attributes/features/descriptors and a similarity clustering analysis to uncover a large number of catchments that have similar features/attributes/descriptors regardless of whether the catchments are in close proximity or have overlapping geographical properties. For example, a catchment in Arizona and a catchment in Ireland can be used to train a forecasting model if their features/attributes/descriptors are sufficiently similar. Additionally, the difficulty that known machine learning forecasting systems have with handling unstructured data is addressed in embodiments of the invention by utilizing graphs to represent unstructured data can be represented more easily in graphs than in machine learning vectors.

An example of machine learning techniques that can be used to implement aspects of the invention will be described with reference to FIGS. 6 and 7. Machine learning models configured and arranged according to embodiments of the invention will be described with reference to FIG. 6. Detailed descriptions of an example computing environment 800 and network architecture capable of implementing embodiments of the invention described herein will be provided with reference to FIG. 8.

Figure 6:
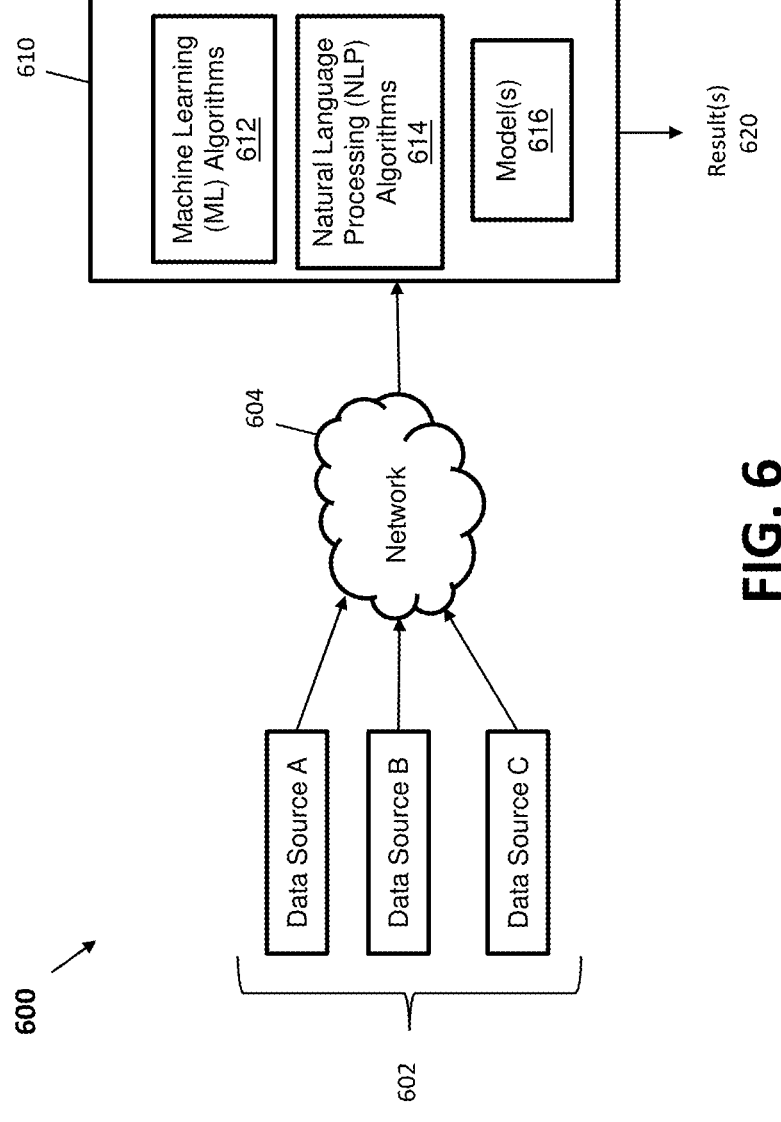
FIG. 6 depicts a machine learning system that can be utilized to implement aspects of the invention.

FIG. 6 depicts a block diagram showing a classifier system 600 capable of implementing various aspects of the invention described herein. More specifically, the functionality of the system 600 is used in embodiments of the invention to generate various models and/or sub-models that can be used to implement computer functionality in embodiments of the invention. The system 600 includes multiple data sources 602 in communication through a network 604 with a classifier 610. In some aspects of the invention, the data sources 602 can bypass the network 604 and feed directly into the classifier 610. The data sources 602 provide data/information inputs that will be evaluated by the classifier 610 in accordance with embodiments of the invention. The data sources 602 also provide data/information inputs that can be used by the classifier 610 to train and/or update model(s) 616 created by the classifier 610. The data sources 602 can be implemented as a wide variety of data sources, including but not limited to, sensors configured to gather real time data, data repositories (including training data repositories), and outputs from other classifiers. The network 604 can be any type of communications network, including but not limited to local networks, wide area networks, private networks, the Internet, and the like.

The classifier 610 can be implemented as algorithms executed by a programmable computer such as the computing environment 800 (shown in FIG. 8). As shown in FIG. 6, the classifier 610 includes a suite of machine learning (ML) algorithms 612; natural language processing (NLP) algorithms 614; and model(s) 616 that are relationship (or prediction) algorithms generated (or learned) by the ML algorithms 612. The algorithms 612, 614, 616 of the classifier 610 are depicted separately for ease of illustration and explanation. In embodiments of the invention, the functions performed by the various algorithms 612, 614, 616 of the classifier 610 can be distributed differently than shown. For example, where the classifier 610 is configured to perform an overall task having sub-tasks, the suite of ML algorithms

612 can be segmented such that a portion of the ML algorithms 612 executes each sub-task and a portion of the ML algorithms 612 executes the overall task. Additionally, in some embodiments of the invention, the NLP algorithms 614 can be integrated within the ML algorithms 612.

The NLP algorithms 614 includes text recognition functionality that allows the classifier 610, and more specifically the ML algorithms 612, to receive natural language data (e.g., text written as English alphabet symbols) and apply elements of language processing, information retrieval, and machine learning to derive meaning from the natural language inputs and potentially take action based on the derived meaning. The NLP algorithms 614 used in accordance with aspects of the invention can also include speech synthesis functionality that allows the classifier 610 to translate the result(s) 620 into natural language (text and audio) to communicate aspects of the result(s) 620 as natural language communications.

The NLP and ML algorithms 614, 612 receive and evaluate input data (i.e., training data and data-under-analysis) from the data sources 602. The ML algorithms 612 include functionality that is necessary to interpret and utilize the input data's format. For example, where the data sources 602 include image data, the ML algorithms 612 can include visual recognition software configured to interpret image data. The ML algorithms 612 apply machine learning techniques to received training data (e.g., data received from one or more of the data sources 602) in order to, over time, create/train/update one or more models 616 that model the overall task and the sub-tasks that the classifier 610 is designed to complete.

Figure 7:
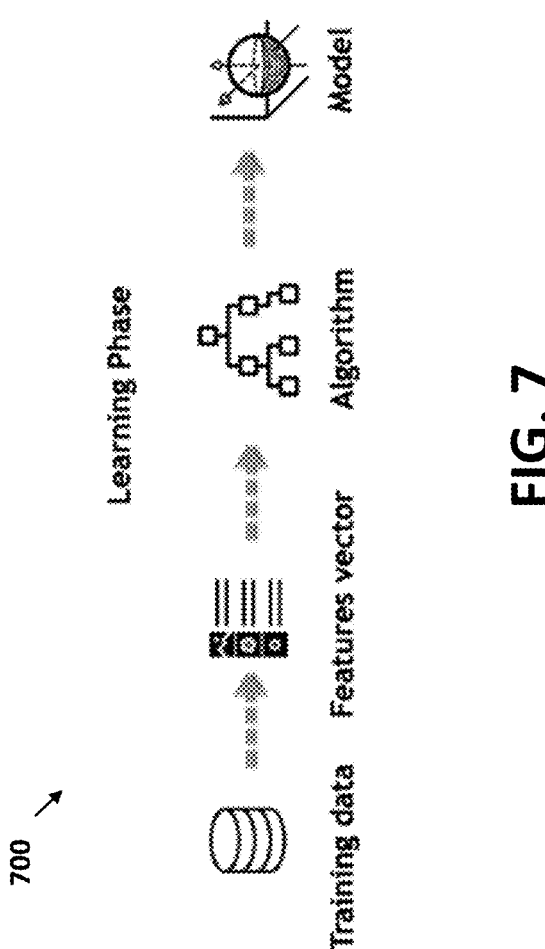
FIG. 7 depicts a learning phase that can be implemented by the machine learning system shown in FIG. 6.

Referring now to FIGS. 6 and 7 collectively, FIG. 7 depicts an example of a learning phase 700 performed by the ML algorithms 612 to generate the above-described models 616. In the learning phase 700, the classifier 610 extracts features from the training data and converts the features to vector representations that can be recognized and analyzed by the ML algorithms 612. The feature vectors are analyzed by the ML algorithm 612 to "classify" the training data against the target model (or the model's task) and uncover relationships between and among the classified training data. Examples of suitable implementations of the ML algorithms 612 include but are not limited to neural networks, support vector machines (SVMs), logistic regression, decision trees, hidden Markov Models (HMMs), etc. The learning or training performed by the ML algorithms 612 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 610 and the ML algorithms 612. Unsupervised learning can utilize additional learning/training methods including, for example, clustering, anomaly detection, neural networks, deep learning, and the like.

When the models 616 are sufficiently trained by the ML algorithms 612, the data sources 602 that generate "real world" data are accessed, and the "real world" data is applied to the models 616 to generate usable versions of the results 620. In some embodiments of the invention, the results 620 can be fed back to the classifier 610 and used by the ML algorithms 612 as additional training data for updating and/or refining the models 616.

In aspects of the invention, the ML algorithms 612 and the models 616 can be configured to apply confidence levels (CLs) to various ones of their results/determinations (including the results 620) in order to improve the overall accuracy of the particular result/determination. When the ML algorithms 612 and/or the models 616 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 610 can be configured to apply confidence levels (CLs) to the results 620. When the classifier 610 determines that a CL in the results 620 is below a predetermined threshold (TH) (i.e., CL<TH), the results 620 can be classified as sufficiently low to justify a classification of "no confidence" in the results 620. If CL>TH, the results 620 can be classified as sufficiently high to justify a determination that the results 620 are valid. Many different predetermined TH levels can be provided such that the results 620 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 depicts an example computing environment 800 that can be used to implement aspects of the invention. Computing environment 800 contains an example of an environment for the execution of at least some of the computer code involved in performing the inventive methods, such as computer-implemented methods and computer program products 850 operable to forecast land-based environmental variables (e.g., hydrological responses, evapotranspiration metrics, crop-yield, crop-growth, etc.) using a similarity analysis and temporal graph convolutional neural networks. In addition to block 850, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 850, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 850 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 850 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "catchment" is used to identify an area of land, usually surrounded by mountains or hills, over which water flows and is collected. Within a catchment, water runs by gravity to the lowest point.

Additionally, the terms "catchment delineation" and variations thereof are used to identify a process to delineate a watershed into smaller-sized areas where variables can be considered homogenous.

Additionally, the terms "catchment attributes" and variations thereof are used to identify descriptors of a landscape. Their interplay shapes catchment behaviour by influencing how catchments store and transfer water.

Additionally, the terms "graph neural network" (GNN) are used to identify a class of artificial neural networks for processing data that can be represented as graphs.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of analyzing a land region that has been decomposed into a plurality of sub-regions that capture spatial heterogeneity of environmental conditions across the land region, the computer-implemented method comprising:

applying, using a processor system, a feature extraction process that extracts a set of sub-region environmental descriptors for each of the plurality of sub-regions;

wherein the plurality of sub-regions comprise catchments that are irregularly-shaped;

wherein the sub-region environmental descriptors comprise non-linear relationships with one another;

wherein the set of sub-region environmental descriptors include dynamic descriptors that change over time, the dynamic descriptors comprising time series of daily values of the dynamic descriptors;

applying, using the processor system, a similarity analysis to the set of sub-region environmental descriptors to generate groups of the plurality of sub-regions;

creating, using the processor system, a plurality of group-based graphs by encoding each of the groups into a corresponding group-based graph; and using a spatio-temporal neural network to train a model based at least in part on the plurality of group-based graphs.

2. The computer-implemented method of claim 1, wherein the set of sub-region environmental descriptors comprise static descriptors that do not substantially change over time.

3. The computer-implemented method of claim 1, wherein:

the similarity analysis comprises a cluster analysis; and the processor system uses a cluster algorithm to apply the cluster analysis to the set of sub-region environmental descriptors.

4. The computer-implemented method of claim 3, wherein the groups comprise clusters.

5. The computer-implemented method of claim 4, wherein:

the cluster analysis is operable to generate inter-cluster distance data; and the processor system is operable to create the plurality of group-based graphs by encoding the inter-cluster distance data.

6. The computer-implemented method of claim 5, wherein:

the cluster analysis is operable to generate intra-cluster distance data; and the processor system is further operable to create the plurality of group-based graphs by encoding the intra-cluster distance data.

7. The computer-implemented method of claim 6, wherein a trained version of the model is operable to receive data of a new sub-region and forecast a land-based environmental variable of the new sub-region.

8. A computer-based system comprising a memory and a processor system communicatively coupled to the memory, wherein the processor system is operable to perform processor system operations operable to analyze a land region that has been decomposed into a plurality of sub-regions that capture spatial heterogeneity of environmental conditions across the land region, the processor systems operations comprising:

applying a feature extraction process that extracts a set of sub-region environmental descriptors for each of the plurality of sub-regions;

wherein the plurality of sub-regions comprise catchments that are irregularly-shaped;

wherein the sub-region environmental descriptors comprise non-linear relationships with one another;

wherein the set of sub-region environmental descriptors include dynamic descriptors that change over time, the dynamic descriptors comprising time series of daily values of the dynamic descriptors;

applying a similarity analysis to the set of sub-region environmental descriptors to generate groups of the plurality of sub-regions;

creating a plurality of group-based graphs by encoding each of the groups into a corresponding group-based graph; and using a spatio-temporal neural network to train a model based at least in part on the plurality of group-based graphs.

9. The computer-based system of claim 8, wherein the set of sub-region environmental descriptors comprise static descriptors that do not substantially change over time.

10. The computer-based system of claim 8, wherein:

the similarity analysis comprises a cluster analysis; and the processor system operations use a cluster algorithm to apply the cluster analysis to the set of sub-region environmental descriptors.

11. The computer-based system of claim 10, wherein the groups comprise clusters.

12. The computer-based system of claim 11, wherein:

the cluster analysis is operable to generate inter-cluster distance data; and the processor system operations further comprise creating the plurality of group-based graphs by encoding the inter-cluster distance data.

13. The computer-based system of claim 12, wherein:

the cluster analysis is operable to generate intra-cluster distance data; and the processor system operations further comprise creating the plurality of group-based graphs by encoding the intra-cluster distance data.

14. The computer-based system of claim 13, wherein a trained version of the model is operable to receive data of a new sub-region and forecast a land-based environmental variable of the new sub-region.

15. A computer program product comprising a computer readable program stored on a computer readable storage medium, wherein the computer readable program, when executed on a processor system, causes the processor system to perform processor system operations operable to analyze a land region that has been decomposed into a plurality of sub-regions that capture spatial heterogeneity of environmental conditions across the land region, the processor system operations comprising:

applying a feature extraction process that extracts a set of sub-region environmental descriptors for each of the plurality of sub-regions;

wherein the plurality of sub-regions comprise catchments that are irregularly-shaped;

wherein the sub-region environmental descriptors comprise non-linear relationships with one another;

wherein the set of sub-region environmental descriptors include dynamic descriptors that change over time, the dynamic descriptors comprising time series of daily values of the dynamic descriptors;

applying a similarity analysis to the set of sub-region environmental descriptors to generate groups of the plurality of sub-regions;

creating a plurality of group-based graphs by encoding each of the groups into a corresponding group-based graph; and using a spatio-temporal neural network to train a model based at least in part on the plurality of group-based graphs.

16. The computer program product of claim 15, wherein the set of sub-region environmental descriptors comprise static descriptors that do not substantially change over time.

17. The computer program product of claim 15, wherein:

the similarity analysis comprises a cluster analysis; and the processor system operations use a cluster algorithm to apply the cluster analysis to the set of sub-region environmental descriptors.

18. The computer program product of claim 17, wherein the groups comprise clusters.

19. The computer program product of claim 18, wherein:

the cluster analysis is operable to generate inter-cluster distance data; and the processor system operations further comprise creating the plurality of group-based graphs by encoding the inter-cluster distance data.

20. The computer program product of claim 19, wherein:

the cluster analysis is operable to generate intra-cluster distance data;

the processor system operations further comprise creating the plurality of group-based graphs by encoding the intra-cluster distance data; and a trained version of the model is operable to receive data of a new sub-region and forecast a land-based environmental variable of the new sub-region.

* * * * *